United States Patent [19]
Brown

[11] 3,777,438
[45] Dec. 11, 1973

[54] ORNAMENTAL PROTECTIVE RAIL
[76] Inventor: Russell L. Brown, 1620 Kingsbury Ln., Oklahoma City, Okla. 73112
[22] Filed: Aug. 30, 1971
[21] Appl. No.: 176,113

[52] U.S. Cl.................. 52/173, 293/1, 293/71 R, 52/718
[51] Int. Cl.................. E04f 19/02, B60r 13/04
[58] Field of Search.................. 52/173, 716, 717, 52/718, 312; 161/104, 119, 120, 167, 406; 293/1, 54 D, 71 R, 62, 66

[56] References Cited
UNITED STATES PATENTS

| | | | |
|---|---|---|---|
| 2,993,722 | 7/1961 | Borah | 293/71 R |
| 3,574,379 | 4/1971 | Jordan | 293/60 X |
| 3,573,465 | 12/1970 | Jackson | 293/1 X |
| 3,572,799 | 3/1971 | Truesdell et al. | 52/718 X |
| 3,451,709 | 6/1969 | Swauger | 293/54 D UX |

Primary Examiner—Frank L. Abbott
Assistant Examiner—John R. Masterman
Attorney—Dunlap, Laney et al.

[57] ABSTRACT

An ornamental protective rail including an elongated strip of elastomeric flexible material having a pair of inwardly turned retainer toes adjacent the side edges thereof along a bottom portion of the elongated strip, and further having, in a preferred embodiment, a slot extending from the central portion of the bottom of the strip interiorly of the strip. A rigid strengthening and reinforcing member is retained in a longitudinally extending channel formed by the toes, and preferably carries a flange projecting normal to the retaining strip into the slot formed in the elastomeric strip. A strip of compressible material is bonded to the rigid reinforcing strip along one side of the strip of compressible material and has an adhesive material on the opposite side of the strip of compressible material.

1 Claim, 4 Drawing Figures

PATENTED DEC 11 1973 3,777,438

INVENTOR
RUSSELL L. BROWN

BY
Dunlap, Laney, Hessin & Dougherty
ATTORNEYS 3,777,438

ORNAMENTAL PROTECTIVE RAIL

BACKGROUND OF THE INVENTION

1. Field of the Invention

This invention relates to protective rails or strips of the type used as chair rails in homes, bumper rails along baseboards or ornamental, protective strips along the sides of the bodies of automobiles. More particularly, but not by way of limitation, the invention relates to an ornamental protective rail carrying a contact adhesive material along one side thereof to permit the rail to be secured to a surface.

2. Brief Description of the Prior Art

In U.S. Pat. No. 3,451,709, a side wall and fender protector for automobiles is disclosed which is in the form of an elongated strip of metal or rigid plastic which carries an elongated strip or band of adhesive material between a pair of parallel side beads formed on the strip adjacent its bottom side. The adhesive strip is used to secure the side wall and fender protector to the metal of which the side wall and fenders of an automobile are constructed. Due to the rigidity of the extrusion or external bumper strip, the protector, when adhered in place, extends in a straight line over its length. The rigidity of the metal or rigid plastic strip prevents waivering or variation from the straight mounting line, and thus the strip is aesthetic in its appearance when secured in place.

BRIEF DESCRIPTION OF THE PRESENT INVENTION

This invention provides an improved ornamental protective rail which is constructed of a flexible elastomeric material such as extruded vinyl resin, which rail may be relatively easily bent in one plane along its length, but which has sufficient rigidity that it does not waiver from a line extended parallel to its longitudinal axis as it is being applied, or after it has been bonded to the surface upon which it is to be mounted.

Broadly described, the present invention comprises an elongated strip or band of a flexible, relatively resilient material, and preferably an extrusion of polyvinyl chloride. The cross sectional configuration of the elongated strip of flexible material is such that a pair of toes extending from one side of the strip adjacent the two parallel longitudinal edges thereof define a channel which opens downwardly. Pressed into the channel is a thin, elongated band of rigid reinforcing material such as metal or a relatively high density synthetic resin. In a preferred embodiment of the invention, the strip of rigid reinforcing material has a tongue or flange projecting therefrom at a right angle, and extending into a slot or groove formed between the longitudinal edges of the flexible strip. Adhesive means is carried on the opposite side of the rigid strip or band from the side thereof from which the tongue or flange projects, and the adhesive means functions to permit the protective rail assembly to be bonded or adhered to a supporting surface.

In a preferred embodiment of the invention, the adhesive means may be the type of material shown and described in U.S. Pat. No. 3,451,709, i.e. a hard rubber base, such as polyurethane, coated or covered with an adhesive on the surface opposite a surface secured to the rigid reinforcing strip or band. The adhesive means may also be an elongated strip of felt-like material which can undergo some compression upon mounting the ornamental protective rail upon a supporting surface with the felt material being bonded at one of its surfaces to the rigid reinforcing strip, and having the other surface coated with a tacky, contact-type adhesive material. The exposed adhesive is preferably covered with a tear-away protective strip which can be instantly removed when the protective ornamental rail is to be mounted in its operative position.

An object of the invention is to provide an ornamental protective rail which has the surface thereof exposed to contact with a chair, cart or other article likely to impact against a wall protected by the rail, and made of a flexible, relatively resilient material which can be provided with a variety of colors or hues to provide a chosen aesthetic effect.

Another oject of the invention is to provide a protective ornamental rail which can be easily bent or curved around curves of a relatively sharp radius in the plane of the longitudinal axis of the rail, but which is sufficiently stiff that it does not waiver or depart from linearity along its longitudinal axis as it is applied, or after extended periods of usage.

An additional object of the invention is to provide a protective rail which can be instantly adhered to the surface upon which it is to be mounted by contact with that surface.

A further object of the invention is to provide an elongated ornamental protective rail which can be stored in rolls, but which can be quickly mounted on a surface without exercising extreme care to prevent waivering or departure from linearity along a line of mounting on the surface.

Yet another object is to provide an elongated strip of protective material which has sufficient rigidity to facilitate mounting in a straight line and which can be quickly cut to any desired length. The cut ends of the strip can be aesthetically finished by the mounting of aesthetic terminal caps thereon.

Additional objects and advantages of the invention will become apparent as the following detailed description of the invention is read in conjunction with the accompanying drawings which illustrate the invention.

DETAILED DESCRIPTION OF PREFERRED EMBODIMENTS OF THE INVENTION

Figure 1:
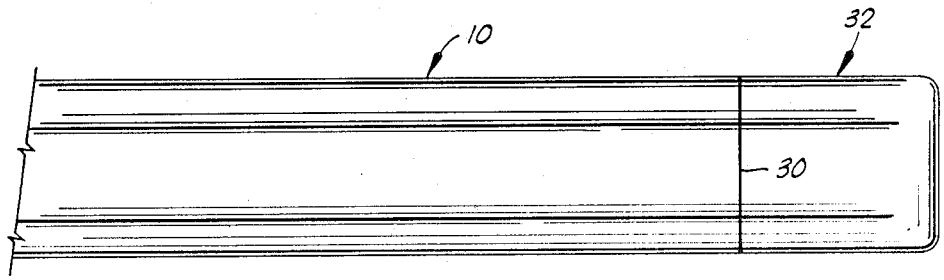
FIG. 1 is a view in elevation showing one end portion of the elongated protective rail of the invention, and showing one of the terminal caps secured in position at the end of the rail.

Referring initially to FIG. 1 of the drawings, an end portion of an elongated, ornamental protective rail constructed in accordance with one embodiment of the invention is shown therein. It will be understood that the end portion of this rail opposite that which is shown in the drawing is identical to the end portion there appearing, and that the rails of the invention may be made by varying lengths as may be required or needed for different applications. As will be hereinafter explained, the manner in which the rails are made also permits them to be cut to a desired length in situations where fitting to a particular geometric mounting requirement is entailed.

The ornamental protective rail in the embodiment shown in FIG. 1 includes an elongated strip of elastomeric material designated generally by reference numeral 10. As will be perceived in referring to FIGS. 2 and 3, the elastomeric material includes a pair of retainer toes 12 disposed at the bottom side of the strip and turned inwardly to define a downwardly opening channel on the lower side of the strip of elastomeric material. The elastomeric material utilized in the strip 10 is flexible and has a significant degree of resiliency. In a preferred embodiment of the invention, the strip 10 is a vinyl resin extrusion. Although a strip 10 is shown which is of trapezoidal configuration in cross section as shown in FIG. 3, other cross sectional configurations can be utilized.

It has been previously known to undertake on some occasions to utilize extruded vinyl strips for ornamental beads and protective rails on a variety of surfaces. It has been found, however, that where the usage made of beads and rails of this type has required the extrusions to be extended over substantial distances along the longitudinal axis of the extrusion, it is difficult to mount the rail or bead in a straight line without the development of some perceptible waivering or curving at points along this line in a direction which is normal to the longitudinal axis of the extrusion. This results from the flexibility of the material of construction. The same flexibility provides another desirable property, however; this being that of permitting the extrusion to be bent in the plane which contains the longitudinal axis of the extrusion so that the beads or rails can be easily mounted on curved surfaces where a small radius of curvature is not involved.

In the present invention, a rigid strengthening and reinforcing member or band 16 is snapped into, or positioned within, the channel 14 so that the opposed longitudinal edges of this band are gripped or engaged by the retainer toes 12. The band 16 is preferably made of metal or high density synthetic resin. In one embodiment of the invention, the strengthening and reinforcing member or band 16 is provided with a tongue or flange 18 which projects normal to one surface thereof, and is received in a slot or groove 20 projecting into the center of the strip of elastomeric material 10 from the lower side thereof. It will further be noted in reference to FIG. 3 of the drawing that the flange or tongue 18 carries at its upper end an enlarged head 18a which may be forced into a correspondingly shaped portion of the slot or groove 20 to provide a snap-in or interlocking feature.

Secured to the exposed lower side of the rigid strengthening and reinforcing member 16 is adhesive means designated generally by reference numeral 22. In the embodiment of the invention depicted in FIG. 1, the adhesive means includes a strip of compressible material 24 which is bonded by any suitable means along one of its sides to the rigid strengthening and reinforcing member 16. The opposite side of the compressible material 24 carries an adhesive 26 which is preferably a contact type of adhesive which will adhere to metals, masonry, wallboard and most other surfaces upon being pressed against such surfaces. The adhesive material 26 is preferably protectively covered by a tear-away protective strip 28 which prevents moisture loss from the adhesive, and prevents foreign materials from being stuck or bonded to the adhesive. The tear-away protective strip 28 may be any of the types commonly used in the art, and may have, for example, a layer of a silicone material adjacent the adhesive to prevent the protective strip from becoming permanently bonded to the adhesive.

Figure 2:
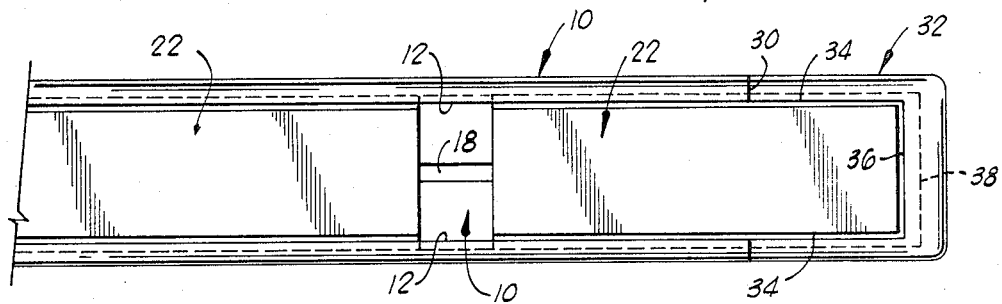
FIG. 2 is a bottom plan view of the assembly depicted in FIG. 1.
Figures 3, 4:
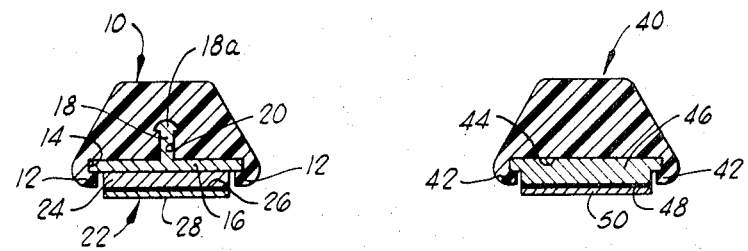
FIG. 3 is a sectional view taken along line 3—3 of FIG. 1.
FIG. 4 is a sectional view similar to FIG. 3 but taken through a modified embodiment of the invention.

The appearance of the bottom side of the ornamental protective rail shown is depicted in FIG. 2. It will be noted in referring to this figure of the drawings that the rigid strengthening and reinforcing member 16 and the adhesive means 22 carried thereby terminate short of the end boundary 30 of the strip 10 of elastomeric material. This permits the attachment to the end of the strip 10 of a terminal cap designated generally by reference numeral 32. There is, of course, mounted at the opposite end of the strip 10 from that which is shown in the drawings, an identical terminal cap 32 so that the ends of the ornamental protective rail are aesthetically finished. The terminal cap 32 is preferably constructed of a material identical to that from which the strip 10 is made, but may be made of different materials if desired. The terminal cap 32 includes a pair of retainer toes 34 which are turned inwardly to form a downwardly facing channel in the same fashion as is characteristic of the toes 12 on the strip 10. At the end of the terminal cap 32, an in-turned lip 36 is provided to form a transverse channel for receiving an end portion 38 of a relatively short section of the rigid strengthening and reinforcing member 16. The relatively short length of the strengthening and reinforcing member 16 is pressed into the channels formed by the toes 34 and lip 36 to afford a splice or sliding joint connection between the terminal cap 32 and the strip of elastomeric material 10. The relatively short length of the member 16 used for this splicing function carries on its lower side, adhesive means 22 which is constructed identically to the adhesive means as previously described.

In the use of the embodiment of the ornamental protective rail of the invention shown in FIGS. 1-3, the particular surface or object upon which the rail is to be mounted is first considered to determine the linear dimension over which the rail must extend. A rail which is made of a correct length to fit this dimension is then prepared for adherence to the supporting surface by tearing away the protective strip 22 to expose the adhesive 26 carried on the lower side of the strip of compressible material 24. The ornamental protective rail can then be extended along the surface to which it is to be bonded, and pressed into proper position thereon so that the adhesive contacts the surface and bonds the rail thereto. In thus positioning the protective rail, the reinforcing member 16 prevents the relatively flexible strip 10 from waivering from true linearity along the longitudinal axis. At the same time, the relatively thin dimension of the reinforcing member 16 permits the entire protective rail to be curved in a plane which extends through, and includes, the longitudinal axis of the rail, and which extends substantially normal to the surface upon which it is to be mounted.

It should be pointed out that in some instances, it will be desirable to fabricate the package and ship the strips 10 of elastomeric material separately from the strips of rigid strengthening and reinforcing members 16. This is particularly true where the contemplated usage is apt to involve a variety of miscellaneous lengths of protective rail departing in some instances from any standard requirements. The strips of elastomeric material, with due allowance for the dimensions of the end caps 32, can then be cut to size as needed, and the rigid strengthening and reinforcing members carrying the adhesive means 22 thereon can then be cut in lengths so as to leave adequate room for the splice connection of the terminal caps 32 at the opposite ends thereof. In other words, the rigid strengthening and reinforcing members 16 which will be used with the cut-to-size strips of elastomeric material are cut of shorter lengths than the strips 10 so as to provide a space at each end of the respective strip to receive the short splicing length of rigid strengthening and reinforcing member 16 used in conjunction with each of the terminal caps. The reinforcing members 16 as thus cut are then either snapped into the downwardly opening channel 14 by spreading the toes 12 apart sufficiently to admit the members 16 therebetween, or, alternatively, the reinforcing members 16 may be extended into the channels 14 from one end or the other of the respective strip 10. In a similar fashion, the short splicing section of reinforcing member 16 may be either snapped into its respective terminal cap 32, or may be pressed into the open ended channel of the respective terminal cap. The terminal caps 32 with the projecting short section of the reinforcing member 16 are then joined to the ends of the respective strip 10 by pressing the protuberant portion of the splicing section of reinforcing member into the exposed or open portions of the channel 14 at opposite ends of the respective strip.

It should also be pointed out that, instead of accomplishing the joinder of the terminal caps 32 to the opposite ends of the strip of elastomeric material 10 by the use of a splicing section of reinforcing member 16 carried by the respective terminal cap, a section of the reinforcing member may be utilized which is of greater length than the strip of elastomeric material 10 in which it is to be mounted, so that portions of the reinforcing member project beyond the ends of the strip of elastomeric material. The end caps 32 are then pressed over the projecting portions of the rigid reinforcing member 16 until the terminal caps abut the ends 30 of the strip 10.

A modified embodiment of the invention is depicted in FIG. 4 of the drawings. In this embodiment of the invention, the protective ornamental rail appears substantially the same in elevation as the embodiment depicted in FIG. 1 of the drawings. The protective rail includes an elongated, flexible resilient strip 40 which has formed at the side edges thereof, a pair of in-turned toes 42. The in-turned toes 42 define a channel 44 which extends longitudinally of the strip 40 and receives an elongated rigid reinforcing band or member 46. The reinforcing band 46 is sufficiently flexible to permit it to be bent or curved by forces applied in a direction normal to the major plane of the band. The band 46 is gripped between the in-turned toes 42, and is of generally T-shaped cross sectional configuration as depicted in FIG. 4. On the exposed face of the band 46, a layer of adhesive 48 is bonded and, as in the case of the adhesive 26 depicted in FIG. 3, is covered and protected by a strippable protective covering strip 50.

The protective rail illustrated in cross section in FIG. 4 is finished at its ends with terminal caps similar in construction to those shown in FIGS. 1 and 2. Joinder of the terminal caps to the main elongated body of the rail is here effected, however, by using short splicing sections of the rigid reinforcing band 46. It should also be pointed out that the usage of the embodiment of the invention depicted in FIG. 4 is similar to the usage of the embodiment of the invention depicted in FIGS. 1-3.

Although certain preferred embodiments of the invention have been herein described in order to explain and illustrate the basic principles underlying the invention, it will be understood that various changes and innovations in the depicted and described structures can be effected without departure from these basic principles. Insofar as these basic principles continue to underlie and be the basis for the structures thus subjected to modification, such structures are deemed to be circumscribed by the spirit and scope of the invention, except as the same may be necessarily limited by the appended claims or reasonable equivalents thereof.

What is claimed is:

1. An elongated protective rail comprising:

an elongated strip of flexible, elastomeric material having a pair of integrally formed, in-turned flexible retainer toes extending along a pair of opposite side edges of the strip and defining a pair of parallel channels, said strip further having a flat side extending between said channels and an elongated slot formed therein which extends into said strip substantially perpendicularly from said flat side and terminates in an enlarged portion at its end located interiorly within the flexible, elastomeric material of said strip, said slot being positioned substantially midway between said channels and extending substantially parallel thereto;

an elongated, rigid strengthening and reinforcing member having a flat side abutting the flat side of said strip and having side edges in said channels whereby said in-turned toes releasably retain said reinforcing member in juxtaposition to said strip, said reinforcing member including an elongated flange projecting from the flat side thereof into said slot, said reinforcing member and said flange being conjointly of T-shaped cross-sectional configuration, and said flange having an enlarged edge portion positioned in the enlarged portion of said slot and complimentary in configuration thereto, said elongated, rigid strengthening and reinforcing member and its associated flange extending over a major portion of the length of said strip, but terminating short of the opposite ends thereof to accommodate the hereinafter described splicing sections;

a strip of compressible material secured to said reinforcing member on a surface thereof opposite its flat side, said compressible material extending between said inturned toes and having a flat surface disposed in a plane which passes immediately adjacent said in-turned toes on the opposite side thereof from the slots defined by said toes;

a pressure sensitive adhesive covering said flat surface of said strip of compressible material;

a protective tear-away strip covering said pressure sensitive adhesive;

terminal caps adjacent the opposite ends of the elongated strip; and a pair of rigid reinforcing member splicing sections secured to said strip of flexible, elastomeric material at opposite ends thereof and also each secured to one of said terminal caps to retain the respective terminal cap in juxtaposition to the adjacent end of said strip of flexible, elastomeric material.

* * * * *